C. C. HOWARD.
MOTOR FOR AUTOMOBILE WASHERS.
APPLICATION FILED MAR. 13, 1919.

1,362,420.

Patented Dec. 14, 1920.

Inventor.
CHARLES C. HOWARD
By Fetherstonhaugh
Attys.

UNITED STATES PATENT OFFICE.

CHARLES CLIFFORD HOWARD, OF TORONTO, ONTARIO, CANADA.

MOTOR FOR AUTOMOBILE-WASHERS.

1,362,420.　　　　Specification of Letters Patent.　　Patented Dec. 14, 1920.

Application filed March 13, 1919. Serial No. 282,380.

*To all whom it may concern:*

Be it known that I, CHARLES CLIFFORD HOWARD, of the city of Toronto, in the county of York, in the Province of Ontario, Canada, have invented certain new and useful Improvements in Motors for Automobile-Washers, of which the following is the specification.

My invention relates to improvements in motors for automobile washers and the object of the invention is to devise a simple form of mechanism by which a spray of water may be forced outwardly through a spraying rose and the spraying rose rotated by means operated by the flow of the water through the device and it consists essentially of the following arrangement and construction of parts as hereinafter more particularly explained.

In the drawings like characters of reference indicate corresponding parts in the two figures.

Figures 1, 2:
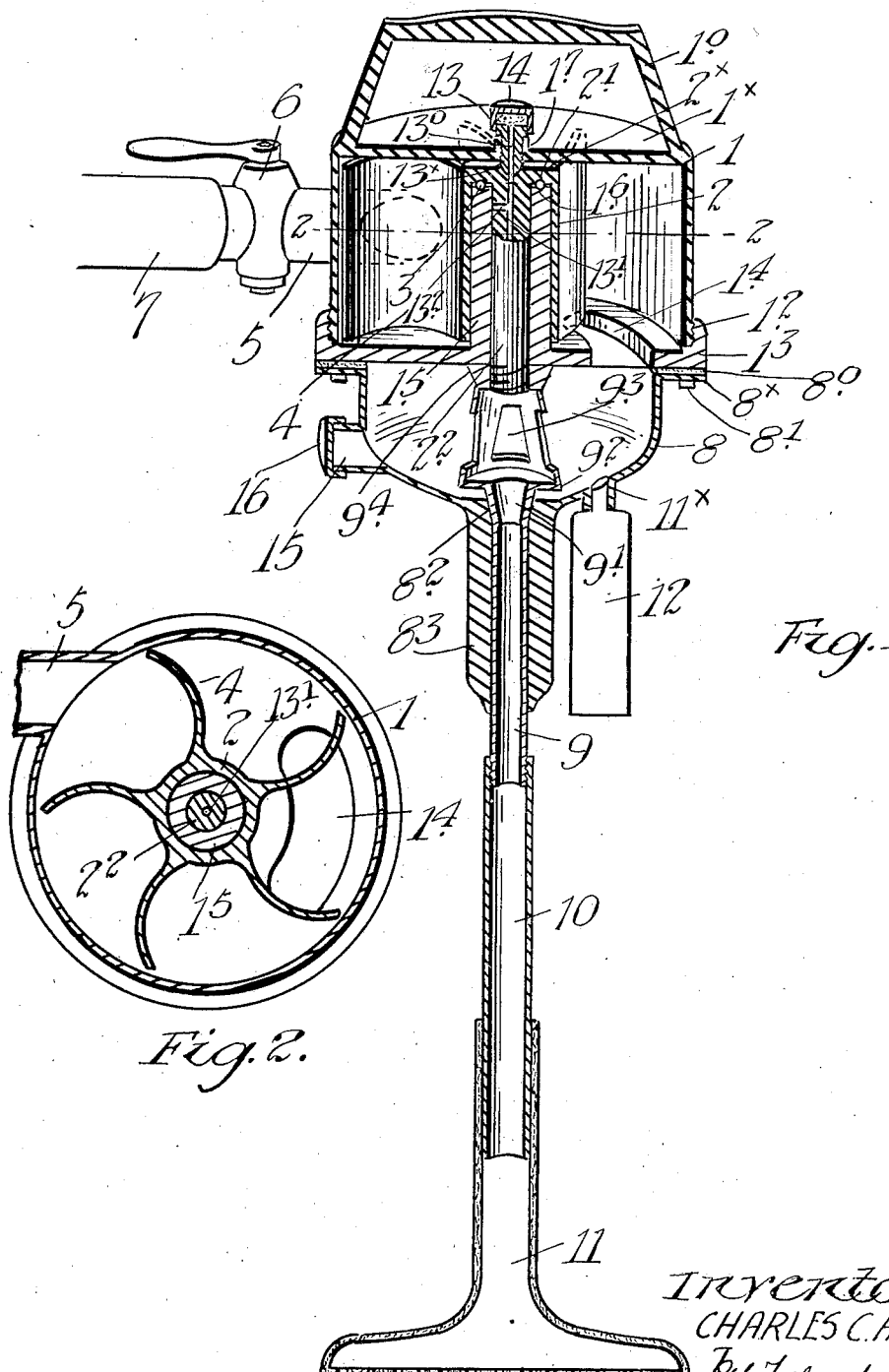
Figure 1, is a sectional view through my device.
Fig. 2, is a plan section on line 2—2 Fig. 1.

1 indicates the casing provided with a closed head $1^x$ from which extends a handle grip $1^o$. The opposite end of the casing 1 is provided with a threaded portion $1^2$ on which is screwed a closing head $1^3$. The closing head $1^3$ is provided with an arc-shaped orifice $1^4$. The center of the closure $1^3$ is provided with a sleeve-like portion $1^5$ forming a hollow boss which extends inwardly of the casing 1 into proximity with the head $1^x$. The upper end of the boss is provided with an annular ball race $1^6$. 2 indicates a sleeve provided with a closed end $2^x$ provided with a ball race $2'$ opposing the ball race $1^6$. 3 indicate ball bearings traveling in the ball races $1^6$ and $2'$. 4 indicate curved vanes which extend outwardly from the sleeve 2 and spaced at suitable distances apart.

5 indicates a water inlet which extends from the casing 1 tangentially thereof, the inlet pipe being provided with a closing cock 6. 7 indicates a hose for supplying water to the inlet pipe 5 and to the interior of the casing 1, directing the stream of water tangentially against the vanes 4, thereby rotating the sleeve 2.

$2^2$ indicates a stud shaft which forms part of the head $2^x$ of the sleeve 2 and extends centrally and longitudinally of the sleeve.

The shaft $2^2$ fits within the hollow boss $1^5$ and projects at its opposite end through the closure head $1^3$. 8 indicates a casing which is secured to the closure head $1^3$ by means of the flanges $8^x$, a rubber gasket $8^o$ being interposed between the flanges $8^x$ and the corresponding portion of the closure head $1^3$. $8'$ indicate bolts for securing the flange $8^x$ to the closure head. The casing 8 is provided with a central orifice $8^2$ which is preferably tapered and around which extends a sleeve-like portion $8^3$ forming a handle grip. 9 indicates a hollow shaft which is journaled within the portion $8^3$ and provided at its inner end with an outwardly tapered portion $9'$ fitting the tapered portion $8^2$. $9^2$ indicates an enlargement, which is formed integral with the shaft 9 and is preferably of inwardly tapered form having a plurality of orifices $9^3$ in the wall thereof. The inner end of the casing $9^2$ is provided with a nut-like portion $9^4$ which is screwed on to the inner end of the shaft $2^2$.

10 indicates a tubular extension to the shaft 9 and on which is carried the spray rose 11, which is formed of canvas and is constructed in any desired form commonly in use. $11^x$ indicates a supplemental orifice formed in the casing 8 in which is secured the neck of a compressible container 12 containing soft soap.

By compressing the container 12 soft soap is supplied to the interior of the casing 8 and is thereby mixed with the water as it is driven through the device.

The head $1^x$ of the casing 1 is provided with a central internally threaded boss $1^7$. 13 indicates a grease cup comprising a screw stem $13^x$ threaded into the internally threaded boss $1^7$ and on which is threaded a cap 14. The screw $13^x$ is provided with a central perforation $13^o$ which feeds the grease down into a longitudinal duct $13'$ provided with branches $13^2$ at suitable points to convey the grease to the bearings. As the water is carried through the pipe 7 and through the water supply 5 it is forced tangentially against the vanes 4, rotating the sleeve 2 and the stud shaft $2^2$ and thereby rotating the tubular shaft 8 so as to impart a swirling action to the spray of water as it is forced out through the perforations of the rose 11.

If it is desired to use my device for drying purposes after the washing of the automobile I pass the stream of water through an outlet 15 which is normally closed by a closure cap 16. When it is desired to dry the parts all that it is necessary to do is to remove the closure cap and allow the stream of water to pass outwardly through the opening 15, which is its easier course instead of passing through the tubular shaft 9.

From this description it will be seen that I have provided a very simple device for washing automobiles, the device being gripped by the grip handle 1° in one hand of the operator and by the sleeve grip 8³ in the other hand of the operator, the rose being automatically rotated by a stream of water passing through the device during the process of washing.

What I claim as my invention is.

The combination with a water supply duct, of a circular casing into which the water is fed tangentially and having an upper closed head and a lower head having a discharge orifice in proximity to its outer edge, a hollow stem formed integral with the lower head of the casing and extending upward therefrom into proximity to the upper head of the casing, a covering sleeve fitting the stem and having a closed upper end resting upon the upper end of the stem, radiating vanes extending from the covering sleeve, a stem depending from the closed upper end of the covering sleeve and extending through the hollow upwardly extending stem of the casing, a discharge tube of less area than the aforesaid discharge orifice of the casing, and means for conducting the water from the discharge orifice in to the tube.

CHARLES CLIFFORD HOWARD.

Witnesses:
M. EGAN,
K. D. POGSON.